United States Patent [19]

Ohki et al.

[11] 4,077,210
[45] Mar. 7, 1978

[54] EXHAUST MANIFOLD

[75] Inventors: Yoshitaka Ohki, Yokohama; Hiroshi Iida, Tokyo; Kenji Kumagai, Oiso; Taro Ishi, Yokohama, all of Japan

[73] Assignee: Nissan Motor Company, Limited, Japan

[21] Appl. No.: 659,407

[22] Filed: Feb. 19, 1976

[30] Foreign Application Priority Data

Feb. 25, 1975  Japan ................... 50-23060

[51] Int. Cl.² ............ F02B 19/10; F02B 75/10; F01N 3/10
[52] U.S. Cl. ...................... 60/282; 60/323; 123/122 AB
[58] Field of Search ............... 60/282, 298, 321, 323, 60/322; 123/122 R, 122 AB, 122 AC, 32 ST

[56] References Cited

U.S. PATENT DOCUMENTS

| 3,413,803 | 12/1968 | Rosenlund | 60/282 |
| 3,722,221 | 3/1973 | Chopin | 60/322 |
| 3,809,019 | 5/1974 | Stoltman | 123/122 AB |
| 3,924,863 | 12/1975 | Nakano | 123/32 ST |
| 3,994,271 | 11/1976 | Ishizuya | 60/282 |

Primary Examiner—Douglas Hart

[57] ABSTRACT

An exhaust manifold has dual liner structure constructed of an intermediate liner forming a chamber and a plurality of sleeves extending outwardly from the chamber and of an inner liner within the intermediate liner. The inner liner forms a reaction chamber within the chamber of the intermediate liner and a plurality of tubes extending outwardly from the reaction chamber and mounted within the sleeves, respectively. The tubes have inlet ports for connection to exhaust ports of an internal combustion engine. The reaction chamber is formed with a plurality of apertures opening to the chamber of the intermediate liner to let hot gases to flow into the chamber of the intermediate liner embracing the reaction chamber. The chamber of the intermediate liner is formed with an outlet port for connection to an exhaust pipe.

2 Claims, 4 Drawing Figures

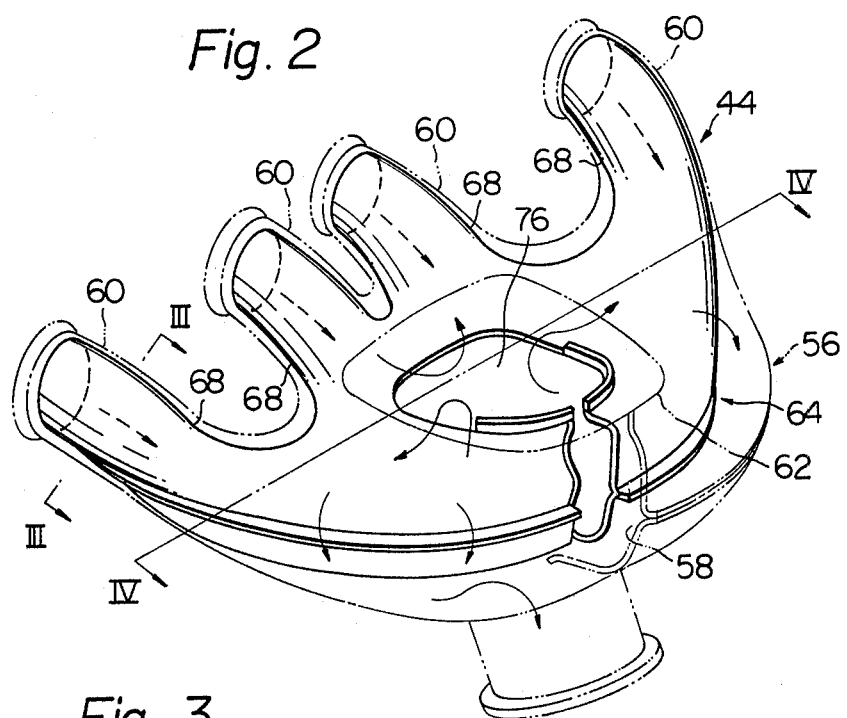
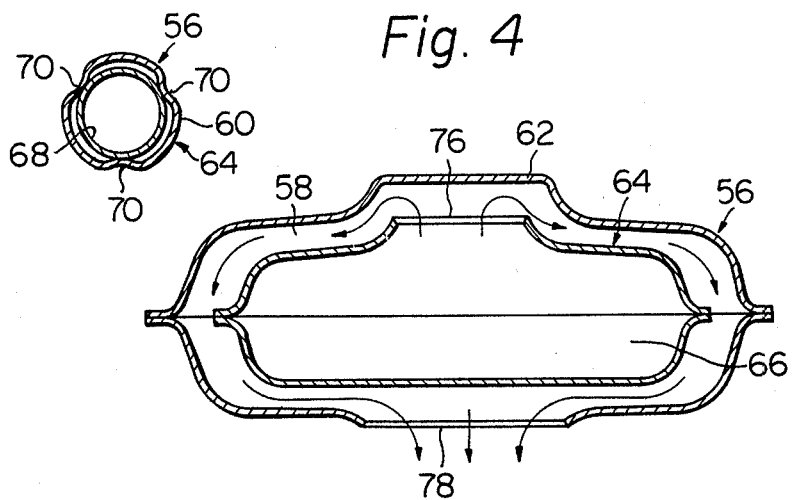

EXHAUST MANIFOLD

The present invention relates to an exhaust manifold and also relates to a manifold system using the exhaust manifold and more particularly to a manifold system for an internal combustion engine of the type including a main combustion chamber and an auxiliary combustion chamber, the latter having a spark plug, the chambers being joined by a torch passage.

It it known to connect an exhaust manifold which has a reaction chamber to an internal combustion engine in which combustion in lean air-fuel mixtures at relatively low peak temperatures takes place. This combustion minimizes nitrogen oxides (NOx) formation and results in oxygen rich exhaust gases, while the exhaust manifold keeps the exhaust gases at elevated temperatures to promote oxidation of hydrocarbon (HC) and carbon monoxide (CO) within the reaction chamber. Many kinds of insulation construction which keep exhaust gases at elevated temperatures during extending time have been proposed. However, the conventional exhaust manifolds have the disadvantage that the temperature within the reactor chamber is likely to drop below the reaction temperature during light load engine operation. This is because there is a great heat loss at the branch passages leading to the reaction chamber which is usually disposed under the intake manifold riser. Besides, because the exhaust gases are directed toward the riser bottom wall to promote vaporization of fuel in the intake air-fuel mixtures, the temperature within the reaction chamber is highly dependent on conditions of the intake mixtures and may drop below the reaction temperature.

A main object of the present invention is to provide an exhaust manifold which can hold the temperature and residence time of exhaust gases high and long enough for oxidation of CO and HC.

Another object of the present invention is to provide an exhaust manifold of the above character, which allows heating of the intake manifold riser without substantial drop of temperature of exhaust gases in the exhaust manifold.

Still another object of the present invention is to provide an exhaust manifold of the above character for use with an internal combustion engine of the type including a main combustion chamber and an auxiliary combustion chamber, the latter having a spark plug, the chambers being joined by a torch passage.

These objects, features and advantages of the present invention will become clear from the following description with reference to the accompanying drawings, in which:

FIG. 1 is a diagrammatic view of a manifold system connected to an internal combustion engine of the type which includes a main combustion chamber and an auxiliary combustion chamber, the latter having a spark plug to eject a flame into the main combustion chamber to ignite the lean mixture through a torch passage joining the auxiliary and main combustion chambers, showing in section an exhaust manifold constructed in accordance with the present invention;

FIG. 2 is a perspective view of the exhaust manifold shown in FIG. 1 disconnected from the engine and intake manifold;

FIG. 3 is a sectional view taken through line III—III in FIG. 2; and

FIG. 4 is a sectional view taken through line IV—IV in FIG. 2.

Figure 1:
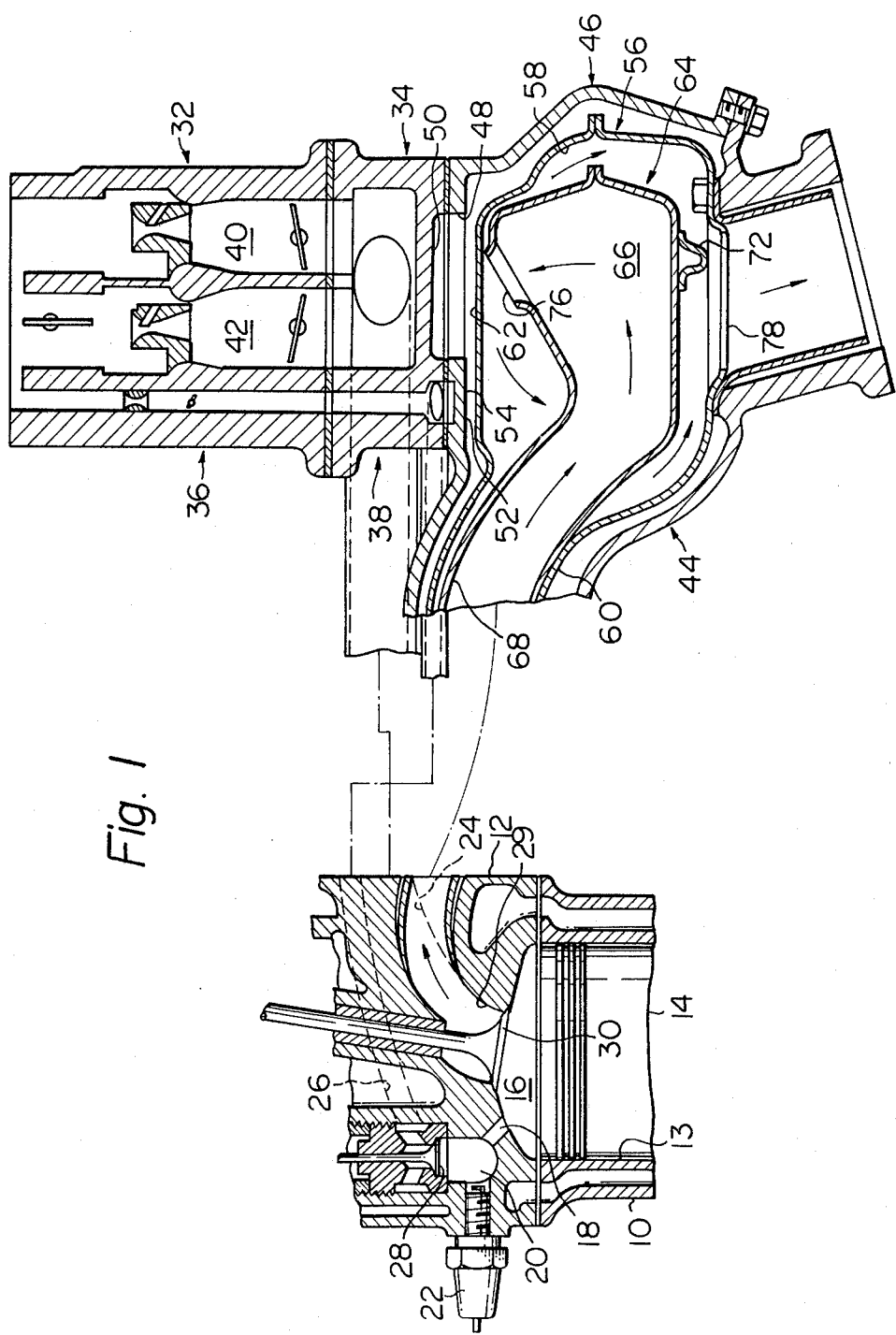

Referring to FIG. 1 of the drawings, an internal combustion engine adapted for use with the exhaust manifold includes an engine block 10 having one or more cylinders capped by an engine head 12. Each cylinder such as 13 is provided with a piston 14, and the engine head 12 is formed with the cylinder and piston, a main combustion chamber 16 connected through a torch passage 18 to an auxiliary combustion chamber 20 provided in the engine head 12. Each auxiliary combustion chamber 20 is provided with a spark plug 22. The engine head 12 is provided with a main intake port 24 and an auxiliary intake port 26 for each main and auxiliary combustion chambers 16 and 20, and the main and auxiliary intake ports are provided respectively with a main intake valve (not shown) and an auxiliary intake valve 28. The engine head 12 is provided also with an exhaust port 29 and an exhaust valve 30.

The main combustion chamber 16 is supplied with a lean air-fuel mixture from a main carburetor 32 through a main intake manifold 34 and the main intake port 24, while the auxiliary combustion chamber 20 with a rich air-fuel mixture from an auxiliary carburetor 36 through an auxiliary intake manifold 38 and the auxiliary intake port 26. The main carburetor 32 is of compound type having a primary barrel 40 and a secondary barrel 42. Exhaust gas resulted from the combustion in the main combustion chamber 16 is discharged through the exhaust port 29 into an exhaust manifold 44.

Referring also to FIG. 2, the exhaust manifold 44 comprises a casing 46 which is made preferably of a cast iron. Mounted on the casing 46 is the main and auxiliary intake manifolds 34 and 38 and formed through the casing 46 are an opening 48 which is positioned in a face-to-face relation with a riser bottom wall 50 of the main intake manifold 34 and a recessed portion 52 which forms a riser bottom wall 54 of the auxiliary intake manifold 38. An intermediate liner 56 made preferably of a stainless thin plate is mounted within the casing 46 and has a chamber 58 and four sleeves 60 extending outwardly from the chamber 58. The intermediate liner 56 also includes a flat heater wall 62 which defines a part of the chamber 58 and which extends in spaced and opposite relation to the riser bottom wall 50 and the recessed portion 52. An inner liner 64 is mounted within the intermediate liner 56 and has a reaction chamber 66 disposed in the chamber 58 and four tubes 68 extending outwardly from the reaction chamber 66 and mounted within the four sleeves 60, respectively. As best seen in FIG. 3, each sleeve 60 is formed with three inwardly projected portions 70 spaced substantially equiangularly from each other and abutting against each tube 68. The reaction chamber 66 is spaced from the interior surface of the chamber 58 by means of a plurality of spacers such as 72. The tubes 68 have inlet ports 74, respectively, for connection to exhaust ports such as 29 of the engine, respectively (see FIG. 1) to convey exhaust gases to the reaction chamber 66. The reaction chamber 66 is formed with at least one aperture such as 76 opening to the chamber 58 to permit gases into the chamber 58 which embraces the reaction chamber 66. Formed in the chamber 58 is an outlet port 78 for connection to an exhaust pipe (not shown). As best seen in FIGS. 2 and 4 the aperture 76 is arranged in the remote side of the inner liner 64 from the side adjacent the outlet port 78 so that flow of exhaust gases may cover substantially all the ouer surface area of the reaction chamber 66 before reaching the outlet port 78.

In order to increase the residence time of the exhaust gases within the reaction chamber 66 so as to promote oxidation of HC and CO, the tubes 68 are inclined downwardly before they open the reaction chamber 66 to change the direction of flow of exhaust gases as the gases enter the reaction chamber 66 through the tubes 68 so that the exhaust gases will flow along the inner wall of the reaction chamber 66 to lengthen flow path of the exhaust gases till the aperture 76. In the embodiment shown in FIG. 1 an upper wall (as viewed in FIG. 1) of the reaction chamber 66 is so inclined with respect to the tubes 68 as to alter the exhaust gases into a direction substantially opposite to a direction of flow as the exhaust gases enter the reaction chamber 66 (see arrows in FIG. 1). Each of the apertures 76 faces the heater wall 62, as seen in FIGS. 1 and 4, to direct hot gases toward the heater wall 62. Due to heat radiated from the heater wall 62 the riser bottom walls 50 and 54 of the main and auxiliary intake manifolds 34 and 38, respectively, will be heated.

It will be observed from the preceding description that because the tubes 68 of the inner 64 convey exhaust gases to the reactor chamber 66, heat loss is minimized.

It will also be observed that because the reaction chamber 66 is disposed within the chamber through which hot gases flow (see FIGS. 1 and 4), the reaction chamber 66 is insulated well.

It will also be observed that because the reaction chamber 66 is shaped to reverse flow of exhaust gases from the tubes 68, the residence time of exhaust gases inside the reaction chamber 66 is increased.

It will further be observed that because the exhaust gases are not in direct contact with the riser bottom wall 50 of the main intake manifold 34 nor the recessed portion 52 forming the riser bottom wall 54 of the auxiliary intake manifold 38, drop of temperature inside the chamber 58 embracing the reaction chamber 66 is not great.

It will further be observed that because the recessed portion 52 of the casing 46 forms the riser bottom wall 54 of the auxiliary intake manifold 38, a relatively rich mixture fed through the auxiliary intake manifold will be vaporized well due not only to heat radiated from the heater wall 62 but also to heat of the casing 46.

What is claimed is:

1. A manifold system for an internal combustion engine comprising:
   an intake manifold having a riser bottom wall; and an exhaust manifold having
   an exhaust manifold casing secured to said intake manifold and having an opening positioned in a face-to-face relation with said riser bottom wall;
   an intermediate liner mounted within said casing, said intermediate liner having a chamber and a plurality of sleeves extending outwardly from said chamber;
   said intermediate liner having a heater wall which forms part of said chamber which extends in spaced and opposite relation to said riser bottom wall so that said riser bottom wall is exposed to heat radiated from said heater wall; and an inner liner mounted within said intermediate liner, said liner having a reaction chamber disposed in said chamber of said intermediate liner and a plurality of tubes extending outwardly from said reaction chamber and through said sleeves, respectively;
   said tubes having inlet ports, respectively, adapted for connection to exhaust ports of the engine,
   said chamber of said intermediate liner defining a space around said reaction chamber,
   said reaction chamber having at least one aperture opening to said space and facing said heater wall to direct the exhaust gases toward said heater wall,
   said chamber of said intermediate liner having an outlet port for connection to an exhaust pipe,
   said aperture of said reaction chamber, said outlet port of said chamber of said intermediate liner and said space between said chamber of said intermediate liner and said reaction chamber of said liner positioned and arranged so that flow of the exhaust gases entering said space from said reaction chamber through said aperture will cover substantially all outer surface area of said reaction chamber before reaching said outlet port,
   said tubes having portions, respectively, before opening to said reaction chamber so that the exhaust gases will flow along the inner wall of said reaction chamber to lengthen the flow path of the exhaust gases to said aperture,
   each sleeve of said intermediate liner being formed with a plurality of inwardly projected portions which are circumferentially spaced with each other and abutting the tube extending through said sleeve.

2. A manifold system for an internal combustion engine of the type including a main combustion chamber and an auxiliary combustion chamber, the latter having an ignition means, the chambers being joined by a torch passage, said manifold system comprising:
   a main intake manifold having a riser bottom wall;
   an auxiliary intake manifold having a riser; and
   an exhaust manifold having an exhaust manifold casing secured to said main and auxiliary intake manifolds, said casing having an opening positioned below said riser bottom of said main intake manifold, said casing having a recessed portion which forms a bottom wall of said riser of said auxiliary intake manifold;
   an intermediate liner mounted within said casing, said intermediate liner having a chamber and a plurality of sleeves extending outwardly from said chamber;
   said intermediate liner having a heater wall which forms part of said chamber and which extends in spaced and opposite relation to said riser bottom wall of said main intake manifold and said recessed portion so that said riser bottom walls of said main and auxiliary intake manifolds are exposed to heat radiated from said heater wall; and
   an inner liner mounted within said intermediate liner, said inner liner having a reaction chamber disposed in said chamber of said intermediate liner and a plurality of tubes extending outwardly from said reaction chamber and through said sleeves, respectively;
   said tubes having inlet ports, respectively, adapted for connection to exhaust ports of the engine,
   said chamber of said intermediate liner defining a space around said reaction chamber,
   said reaction chamber having at least one aperture opening to said space and facing said heater wall to direct the exhaust gases toward said heater wall,
   said chamber of said intermediate liner having an outlet port for connection to an exhaust pipe, said aperture of said reaction chamber, said outlet port of said chamber of said intermediate liner and said space between said chamber of said intermediate liner and said reaction chamber of said inner liner being positioned so that flow of the exhaust gases entering said space from said reaction chamber through said aperture will cover substantially all outer surface area of said reaction chamber before reaching said outlet port, said tubes having curved portions, respectively, before opening to said reaction chamber so that the exhaust gases will flow along the inner wall of said reaction chamber to lengthen the flow path of the exhaust gases to said aperture, each sleeve of said intermediate liner being formed with a plurality of inwardly projected portions which are circumferentially spaced from each other and abutting the tube extending through said sleeve.

* * * * *